US008831979B1

(12) United States Patent
Gerson

(10) Patent No.: US 8,831,979 B1
(45) Date of Patent: Sep. 9, 2014

(54) SYSTEM AND METHOD FOR ANONYMOUS PROCESSING OF FINANCIAL TRANSACTIONS

(76) Inventor: Howard Jeffrey Gerson, Overland Park, KS (US)

( * ) Notice: Subject to any disclaimer, the term of this patent is extended or adjusted under 35 U.S.C. 154(b) by 0 days.

(21) Appl. No.: 13/464,649

(22) Filed: May 4, 2012

Related U.S. Application Data

(60) Provisional application No. 61/483,294, filed on May 6, 2011.

(51) Int. Cl.
*G06Q 20/20* (2012.01)
*H04L 29/06* (2006.01)

(52) U.S. Cl.
USPC .......................................... 705/16; 455/414.3

(58) Field of Classification Search
USPC ........................................................ 705/16
See application file for complete search history.

(56) References Cited

U.S. PATENT DOCUMENTS

| 7,379,913 B2 * | 5/2008 | Steele et al. ..................... 705/38 |
| 7,739,168 B2 * | 6/2010 | Gillin et al. ..................... 705/35 |
| 8,280,359 B2 * | 10/2012 | Moshir et al. .............. 455/414.3 |

* cited by examiner

*Primary Examiner* — Garcia Ade
(74) *Attorney, Agent, or Firm* — Lathrop & Gage LLP

(57) ABSTRACT

A method for anonymous processing of a purchasing request. Initially, a text message comprising the purchasing request is received, by a processing platform, from a mobile phone. A current authorization code comprising a random number is generated in response, and then sent, via a text message, to the mobile phone. A merchant is provided with a pending authorization code, who then sends a communication including the pending authorization code to the platform. The purchasing request is validated in part by determining whether the pending authorization code is identical to the current authorization code.

21 Claims, 5 Drawing Sheets

SYSTEM AND METHOD FOR ANONYMOUS PROCESSING OF FINANCIAL TRANSACTIONS

RELATED APPLICATIONS

This application claims the benefit of priority of U.S. Provisional Application Ser. No. 61/483,294 filed May 6, 2011, incorporated herein by reference.

BACKGROUND

Credit and debit cards are the most common way to make a payment at a physical retail or online Internet merchant location. Currently, there is no method for making a payment with a credit or debit card product, which allows a client's name and credit/debit card information to remain completely anonymous to the retail establishment, without exposing the card number and identity with each transaction.

SUMMARY

The present system and method provides a mechanism for a client to use a mobile phone to request an anonymous financial transaction, and for the merchant to authorize the client request for the anonymous transaction, and optionally, for issuing a reward to the client for participation in a program providing such anonymous transactions. The system authenticates that a client is in possession of their mobile phone and that a transaction request originated from the client's mobile phone and not a hacked or spoofed device.

DETAILED DESCRIPTION

Figure 1:
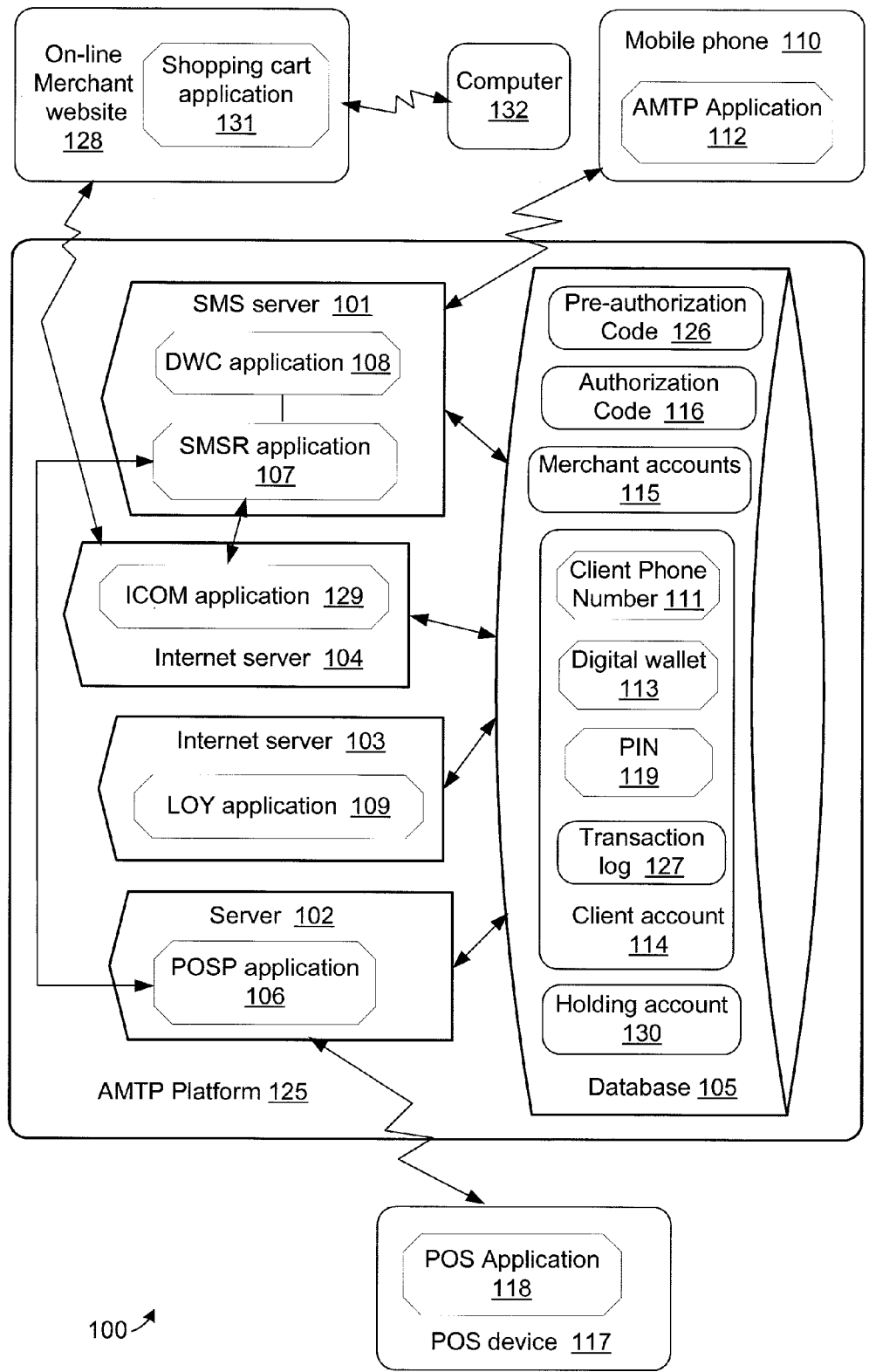
FIG. 1 is an exemplary diagram of the present system.

FIG. 1 is an exemplary diagram of the present system 100 for anonymous processing of financial transactions. In an exemplary embodiment, as shown in FIG. 1, servers 101/102/103/104 provide a communications and processing infrastructure for multiple applications.

An application, hereinafter referred to as SMSR application 107, resides on a secure server 101 that accepts incoming SMS messages from a mobile phone or other text message-capable device 110. Another application, hereinafter referred to as POSP application 106, resides on a secure server 102 and communicates with a merchant site authentication POS (point of sale) device 117 which includes POS application 118. A secure server is one that is accessible only by means of local physical access or by a single server on the same network node, thereby restricting traffic from any other node.

System 100 also includes an Internet server 103 for account maintenance and reporting for merchants and clients, and an Internet server 104 which communicates with online (Internet-based) merchant sites, such as site 128. Each server 101/102/103/104 includes local memory and one or more processors (not shown, as it is understood that computing servers include these types of hardware). The above server infrastructure 101/102/103/104 is coupled to a secure database 105, which collectively comprise AMTP platform 125.

Database 105 stores information including: merchant account information 115, a temporary copy of one or more authorization codes 116 for each purchasing transaction, and client account files 114 (only one is shown for clarity) which include, for each client, client phone number 111, digital wallet account balance 113, and client PIN 119.

In the examples set forth herein, communication between a client's mobile phone 110 and server 101 is via SMS text-messaging protocol, but other suitable communication protocols may be employed in lieu thereof. Mobile phone 110 may be any type of wireless communication device capable of sending and receiving SMS text messages, including basic cellular telephones, 'smart' cellular phones, 'tablets', and the like.

SMSR application 107 is an application, executed on server 101, that receives SMS text messages from a client's mobile phone 110 via an Internet Protocol (IP) connection from a telecommunications carrier or directly via a GSM carrier modem (not shown), and processes the message based on the message content. The application processes SMS text messaging, sending instructions and/or confirmation messaging for each transaction back to the client's mobile phone 110. SMSR application 107 also processes transactions from online merchant sites, via ICOM application 129 on Internet server 104.

In an exemplary embodiment, SMSR application 107 processes transactions that include one or more of the following instructions:

BUY—enables a purchase at a retail merchant location or Internet site,

REFUND—enables a client to receive a refund for a previous transaction at a retail merchant location, LOAD—enables the client to add currency to a digital wallet 113 for future transactions, SEND—enables the client to send currency, coupon, promotion, or SKU-specific items to another recipient, BALANCE—allows a client to determine their current digital wallet balance, JOIN—allows a non-client to add themselves to the AMTP platform as a client, CHANGE PIN—allows a client with a current PIN to change it to a new PIN, PROMO—allows a client to add certain promotions to their account, ADD FUNDS—allows loading money into a client's digital wallet 113 at an authorized retail location, and ACH—is used for settling a client's account with a merchant.

AMTP platform 125 further allows a merchant to create a keyword promotion, that may return an offer or a reward or coupon when one or more keywords are sent by the client. The above instructions and features may be enabled or disabled based on program requirements for all users or certain groups of users.

SMSR application 107 enables a client to self-register with platform 125, to establish a client account 114, using a mobile phone, and to receive current promotions, if enabled by a merchant. The SMSR application also enables a registered user to send currency, coupon, promotion, or SKU-specific items to a new recipient, thereby instantly activating the recipient as a registered user. SMSR application 107 logs each message and transaction sent between a client and servers 101 and 104 in database 105 in transaction log file 127.

POSP application 106 is an application, executed on server 102, that receives data transmission requests from POS (point of sale) device 117 residing at a retail merchant location via a wireless communications protocol using WiFi or GPRS, or via an IP-based protocol using Internet connectivity, from a merchant's physical retail facility. POSP application 106 communicates with database 105 for transaction authentication and merchant authentication, and also communicates with SMSR application 107. Upon completion of a transaction, the status of the transaction is returned by data transmission to merchant POS device 117 (or merchant website) with, for example, an "approved" or "declined" message.

Account Creation and Digital Wallet Loading Procedure

DWC application 108 is an application, executing on server 101, that enables a client to create a digital wallet 113 with specific profile information that is identified by a client's mobile phone number, via SMSR application 107. A client's account information is securely protected by a multi-digit PIN 119 (personal identification number) and a corresponding specific mobile phone number, as explained below. The DWC application allows individual and global settings. DWC application 108 enables a client to add payment products to a digital wallet profile. These payment products may include a default stored value account, a branded existing credit or debit card, and an existing checking or savings bank account. In an exemplary embodiment, DWC payment procedures, by default, involve receiving or processing transactions based on individual user settings, with the default position number one of listed wallet products being the primary position.

DWC application 108 enables a client to change the position of any listed wallet product at any time via an interface to SMSR application 107, and also enables a user to change their PIN 119 at any time. The DWC application may also enable a user to establish a dynamic PIN sequence based on a user-specified formula that may be triggered by time and date, number of uses, or other parameters. The DWC application enables a user to specify maximum transaction limits; such limits may require a secondary or keyword authentication, or the transaction may be blocked based on size, frequency, and/or other parameters.

Figure 2A:
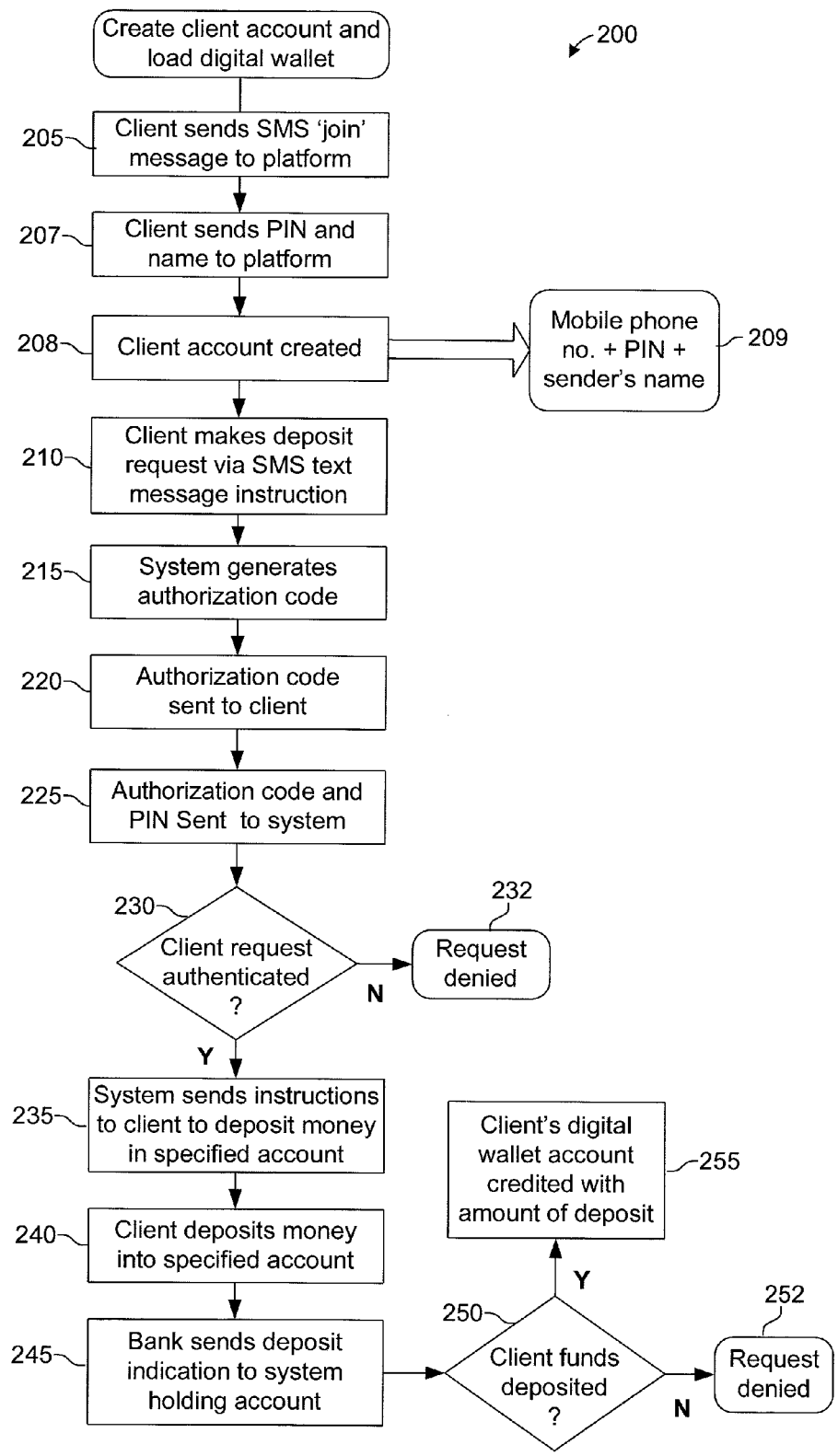
FIG. 2A is a flowchart showing an exemplary set of steps performed in creating a client account and loading the client's digital wallet with currency while the client is at a bank.

FIG. 2A is a flowchart showing an exemplary set of steps 200 performed in creating a client account and loading the client's digital wallet 113 with currency, while the client is at a bank or other financial institution. Initially, a client account 114 must be created on the present system, before a client's digital wallet 113 can be 'loaded' with an electronic currency equivalent. As shown in FIG. 2A, at step 205, the creation of a client account 114 is initiated by a potential client sending an SMS text message, such as "JOIN", from a mobile phone 110 to the appropriate phone number for AMTP platform 125, referred to hereinafter also as simply the "system". The text message is received via server 101, and is directed to SMSR application 107. In an exemplary embodiment, all messages exchanged between a client (or potential client) and the present system are SMS text message communications between mobile phone 110 and platform 125.

The SMSR application then sends the potential client a message requesting a multi-digit (e.g., 4 digit or alphanumeric) PIN 119, and the potential client's name, for example, a first and last name. At step 207, in response to the request, the potential client sends a PIN 119 and a corresponding name. Upon receiving the PIN and the name, the telephone number of the sender's mobile phone 110, the client name, and the received PIN are registered with the system, and an account 114 is established for the client, at step 208. In an exemplary embodiment, the multi-digit PIN 119, the mobile phone number, and the sender's name (block 209) together function as a collective authentication credential, and are stored in client account file 114. Once registered with platform 125, a person (potential client) is considered to be a "client".

At step 210, a client requests that a deposit be made into the digital wallet 113 of an existing account 114. In order to deposit a requested amount of funds into the client's digital wallet 113, a client sends an SMS text message from mobile phone 110 to the AMTP platform phone number. The message specifies a instruction, such as "LOAD".

When the system receives a LOAD instruction, at step 215, SMSR application 107 generates an authorization code 116 (e.g., a randomly generated 3 digit code), which is sent to the client, at step 220, via an SMS message requesting the authorization code and PIN 119, such as, "To authorize your LOAD request, reply to this message with this code 237 and your PIN". In response to the message, at step 225, the client sends the authorization code 116 (which is "237" in the present example) and PIN 119 back to the system via an SMS message, such as, "237 1234". Platform 125 only logs the first three digits of the code/PIN sequence, e.g., 237**** in the system transaction log file 127, so as never to store the client's PIN; only the randomly generated three digit authorization code (237 in the present example) is logged by the system.

At step 230, SMSR application 107 attempts to authenticate the client request by matching the received authorization code 116 and PIN 119, with the authorization code just sent to the client, and the corresponding PIN in the client account file 114 in database 105. If the authentication is unsuccessful, the system returns a message indicating that the LOAD request has been denied, at step 232.

If the authentication is successful, then at step 235, the system sends instructions to the client to make a cash deposit of the requested amount in a specified system account, such as, "Fill out a cash deposit ticket at XYZ Bank with NAME=Mobile Currency ACCT#=123456789 AMOUNT= (insert amount of cash you are loading) and hand to the teller". Then, after a predetermined time, for example, 120 seconds, the platform sends another message to the client that says "To complete your LOAD request, reply to this message with the exact amount of cash you just loaded".

At step 240, the client makes the cash deposit into the specified system account, sends a message (in response to the previous instruction) to the platform, e.g., "$50.00", and an indication of the amount deposited is immediately sent, from the bank receiving the deposit, and a corresponding amount is placed in an internal holding account 130 in database 105, at step 245. The indication that the requested amount has been deposited must be received by platform 125 within a predetermined allotted time (e.g., 120 minutes).

The system determines whether the proper cash deposit has been made in a timely fashion, at step 250, by checking whether the amount of the transaction matches the amount in internal holding account 130, when the allotted time has expired. If there is a match, The client's account is credited with the amount of the deposit, at step 255, by moving the requested amount of funds from internal holding account 130 into the client's digital wallet account 113, and a message is sent to the client, such as, "Your LOAD is complete in the amount of $50.00. Your new balance is $75.00". The transaction is completed by transferring the deposit into the specified system account at the end of the business day. If, however, within the allotted time, the client does not make the deposit and reply with the amount deposited, cancellation of the transaction occurs, at step 252, and the system sends a message to the client, such as, "Your load request has been canceled".

Figure 2B:
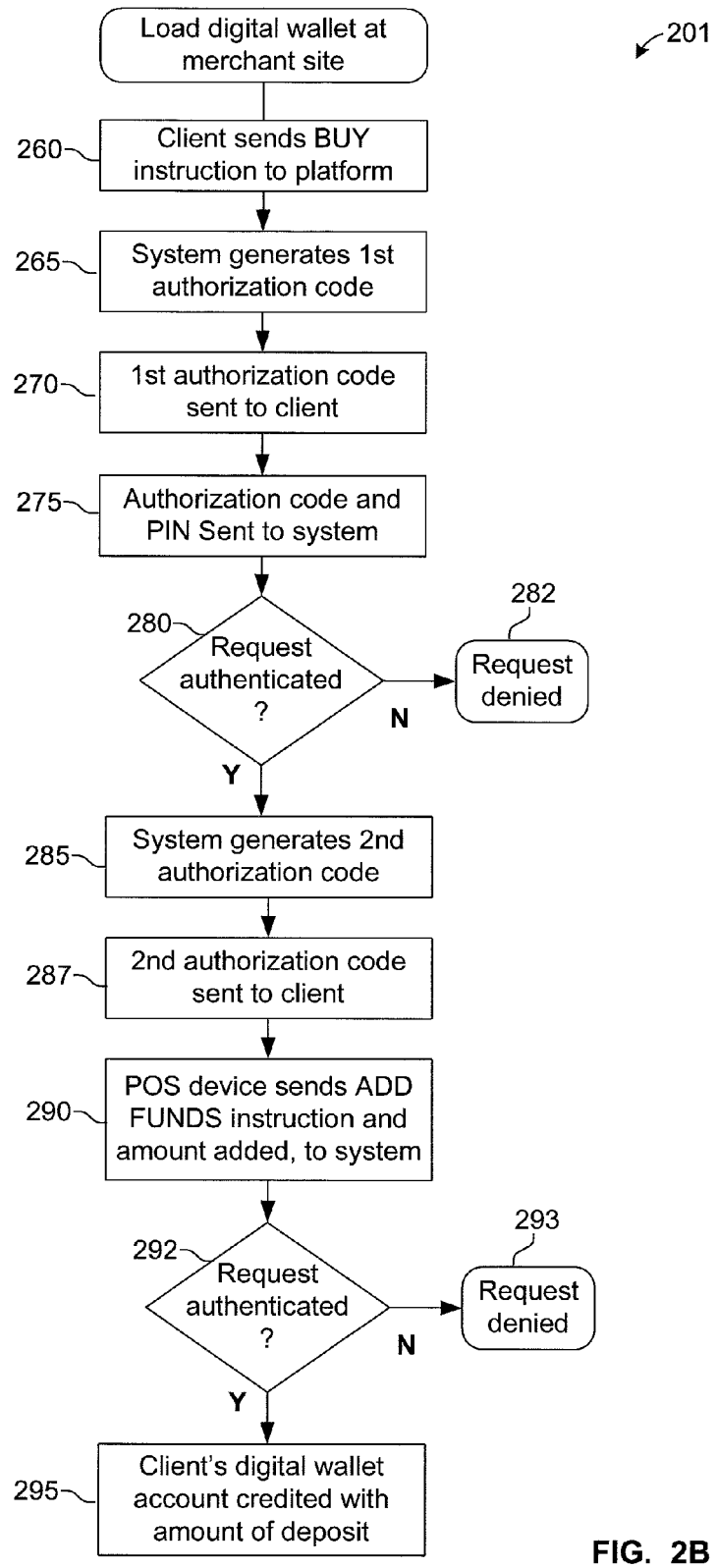
FIG. 2B is a flowchart showing an exemplary set of steps performed in loading a client's digital wallet with currency at a merchant location.

FIG. 2B is a flowchart showing an exemplary set of steps 201 performed in loading a client's digital wallet with currency at a merchant location. In the embodiment of FIG. 2B, a client may also load currency into their digital wallet account 113 at an authorized merchant location. As shown in FIG. 2B, at step 260, the client sends an instruction, such as "BUY", to platform 125. At step 265, SMSR application 107 generates a first authorization code 116, for example, a 3 digit random number, which is sent to the client at step 270, via an SMS message requesting the authorization code 116 and PIN 119, such as, "To authorize your request please reply to this message with 851 and your PIN".

At step 275, the client responds to the message by sending the authorization code 116 (which is "851" in the present example) and PIN 119 back to the system via an SMS message, such as, "851 1234". At step 280, SMSR application 107 attempts to authenticate the client request by matching the received authorization code and PIN, with the authorization code just sent to the client and the corresponding PIN in the client account file 114 in database 105. If the authentication is unsuccessful, the system returns a message indicating that the LOAD request has been denied, at step 282.

If the authentication is successful, then at step 285, the system generates a second (e.g., 4 digit random number) authorization code 116, and at step 287, sends the code along with instructions to the client, such as, "Your Auth code is 7752 and is valid for a purchase, or to add funds to your digital wallet. This code is valid for up to 60 minutes or until used". The client then hands the appropriate amount of cash to the merchant clerk, who sends an ADD FUNDS or equivalent instruction, including the amount of funds being added to (LOADed into) the client's digital wallet account 113, to system platform 125, using POS device 112, at step 290.

At step 292, the system attempts to authenticate the client request by matching the received authorization code with the authorization code just sent to the client. If the authentication is unsuccessful, the system returns a message indicating that the LOAD request has been denied, at step 293. If the authentication is successful, then the added funds are then moved from a holding account 130 to the client's digital wallet account 113, at step 295.

Receipt of ADD FUNDS by the system indicates that the transaction is being conducted a merchant location (as opposed to a LOAD instruction, which is used when a client makes a cash deposit at a bank). At the end of the day, the merchant sends an ACH instruction (or equivalent) to platform 125, to settle the account with the system.

In one embodiment, a client may request an account balance by sending a message, from mobile phone 110 to the AMTP platform number, including an instruction, for example, BALANCE, and the client's PIN 119. If the PIN received by the system matches a PIN 119 (in client account file 114) that corresponds to both the sender's mobile phone number, then the system returns the account balance by SMS messaging to the sending client's mobile phone.

Electronic funds may also be transferred between two parties using the present system. In one example of a funds transfer, an existing client, party 1, sends a message to the appropriate AMTP platform number, with the transaction amount and the mobile number of a non-client (party 2); for example, "Send 15.00 8889991234". The system confirms party 1 is an established client (via a phone number comparison of the entries in client phone number file 111 in database 105) and that there is a minimum balance of $15.00 available in his digital wallet 113. Next, a check is made to determine if the intended recipient is a current client. Upon a lookup in client phone number file 111, the system determines, that party 2's number is not in the file, and thus this intended recipient is not a current client.

In response, the system sends an SMS text message to party 1's mobile phone 110 indicating, for example, "The recipient 8889991234 is not currently a customer, to add this new client, send $15.00, reply to this message with code 589 (e.g., a 3-digit code, determined by the system) and your PIN". Provided that Party 1 replies correctly, party 2 will then receive an SMS message from server 101 that indicates, for example, "You have received $15.00 from Party 1; to activate your account, reply to this message with your first and last name". Party 2 then replies accordingly, and the system sends an SMS message such as, "You must now create a 4 digit PIN, please reply to this message with that PIN number and your first and last name. Upon receipt of the requested information, a new account is established for party 2, who is now a client of the system, and whose mobile number and PIN 119 is registered in the appropriate files in the system. If there are any associated promotions, they are automatically deposited into party 2's account.

Purchasing Procedure

The present method can be used to allow a merchant's customer (who is also a client in the present system) to make a purchase at either an authorized physical merchant facility (as described immediately below) in or an authorized online merchant (as described further below with respect to FIG. 4). "Authorized" means that there is an existing contractual relationship between the AMTP platform and the 'authorized' merchant for account settlement purposes.

Figure 3:
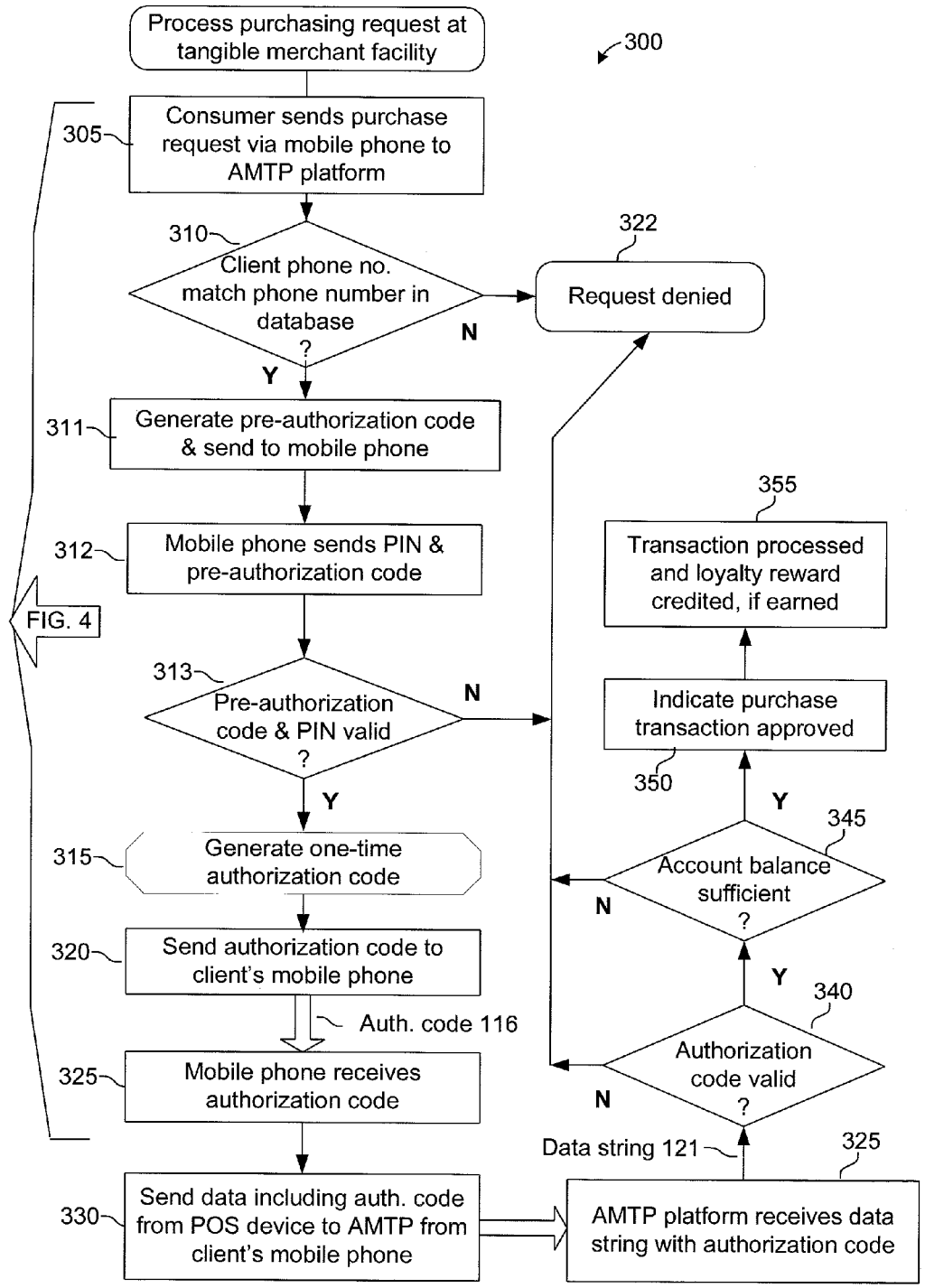
FIG. 3 is a flowchart showing an exemplary set of steps performed in anonymously processing a purchase at a tangible merchant facility.

FIG. 3 is a flowchart showing an exemplary set of steps 300 performed in anonymously processing a purchasing request at a tangible merchant facility, that is, at a store where a purchase is made person-to-person, or specifically, via client-to-merchant employee (e.g., a cashier). As shown in FIG. 3, when a purchasing party, i.e., a client, wants to make a purchase a merchant facility, initially, the client sends a purchase request in the form of an SMS text message to the AMTP platform phone number with an instruction, for example, BUY, at step 305.

At step 310, the system attempts to authenticate the client's account by determining whether there is a matching phone number stored in client phone number file 111 corresponding to the sending mobile phone number. If no match is found, the request is denied, at step 322, and a message is sent to the sender indicating that the sender is not presently an active client. If a phone number match is found, at step 311, the system generates a one-time-use pre-authorization code 126 (e.g., consisting of 3 digits), and returns a message, including the pre-authorization code, to the client phone, such as, "To authorize your request please reply to this message with 530 and your PIN". The client then receives the message, and in response, sends the pre-authorization code (530, in the present example) and PIN back to the platform, at step 312.

In an alternative embodiment, steps 311-313 described above are omitted, and there is no request for, or check for, either or both of a pre-authorization code or a PIN. Alternatively, the PIN check may be omitted and a check performed only for a matching received pre-authorization code 126. If a PIN check is performed, the PIN received must correspond to the phone from which the purchase request was received. This may be determined by checking the phone number stored in client phone number file 111 and associated PIN against the number of the phone from which the purchase request was received, and the received PIN.

In an exemplary embodiment, after a successful authorization of both the pre-authorization code (the first authorization code) 126 and (optionally) the PIN at step 313, the system generates a one-time-use authorization code (a second authorization code) 116 comprising a random number, at step 315.

At step 320, the system sends the authorization code 116 to the client's mobile phone 110 via an SMS message, such as "Your authorization code to make this purchase is 4891 and is valid for a purchase for 60 minutes or until used—please present this code at the time of purchase; your balance is $15.00". Authorization code 116 is valid for only a single transaction, and, in an exemplary embodiment, comprises a four digit random number, although the code may have a different length and/or may include alphanumeric characters. In one embodiment, authorization code 116 may include the last four digits of the client's mobile number, but in all cases includes a randomly generated number.

At step 325, the client receives the authorization code on their mobile phone 110. The client then indicates to a cashier (or other merchant employee) that the transaction is being paid for with a mobile digital wallet, and indicates that the corresponding authorization code (the "pending" authorization code) is, for example, 4891. The cashier then uses POS device 117 (or other in-store point of sale device that includes an appropriate interface) to input the dollar amount of the purchase and the authorization code, and presses a 'send' key or the like, on the device.

In an exemplary embodiment, POS application 118 then generates a data string 121 which includes a merchant ID or account number, a time and date stamp, a transaction amount, an optional transaction type, and the pending authorization code indicated by the client. Data string 121 may, alternatively, include a different set of transactional details, but in all cases includes authorization code 116. In an alternative embodiment, data string 121 may be generated by hardware in POS device 117, after the transaction amount and the authorization code have been manually entered. At step 330, POS device 117 then sends data string 121 to a preset Internet address of server 102 that hosts POSP application 106.

At step 335, data string 121 is received by server 102, and at step 340, POSP application 106 checks database 105 to determine whether the current authorization code 116 is identical to the pending authorization code, to validate that the received pending authorization code is valid for the current transaction. If the current and pending authorization codes match, the client's purchase request is then validated, contingent upon a check of the dollar amount of the transaction against the client's account balance in the client's digital wallet 113, at step 345. Upon confirmation of adequate balance, the purchasing request is validated, and a message is returned to device 117 that displays, for example, "Approved", at step 350.

At step 355, POSP application 106 then processes the validated transaction, including moving the funds from the client's account 114 to the merchant's account 120, and credits the client with a loyalty reward, if earned (in the case where the 'loyalty reward' feature, described below, is enabled). The transaction has been completed as a totally anonymous transaction with respect to the merchant's and with no signature or name exchange. The authorization code 116 that was used in the transaction is now disabled, as the code is valid for that transaction only. The client has left no information behind that can be re-used or misused in a fraudulent manner. In addition, the platform may send a confirmation SMS message to the client indicating, for example, "Your transaction in the amount of $12.77 at Joe's Café is complete; your balance is $22.50".

If a client did not use their registered mobile phone 110 to make a particular purchase, and the original BUY message was sent to the platform from a non-client's (unregistered) phone, through some telephone number spoofing method (and the client's PIN has been compromised), when the system returns the message requesting a reply with the authorization code 116 and PIN 119, it is received as an independent, unsolicited, message to the client's mobile number, as opposed to a legitimate reply message to a purchase request initiated from the client's mobile phone. If the BUY request was initiated by any party from a phone other than the client's registered phone, then that party will not receive the authorization code on their phone. If, however, the client has, in fact, requested to make a purchase, and correctly replies with the one-time authorization code and their PIN, the BUY request must have originated from the client's own phone, and therefore it is assumed that the client was in fact in possession of their registered mobile phone 110 when the BUY request was initiated.

In an exemplary embodiment, a client may also make a purchase anonymously via an electronic 'shopping cart' (or the like) on an online (Internet) site, using a method similar to that described with respect to FIG. 3, with a primary distinction being that an online merchant uses an online shopping cart to perform the same type of account verification as a physical merchant using a POS device. For the purpose of the present document, a "shopping cart" can be defined as a software application used in e-commerce to assist in making purchases online. A shopping cart application allows online shopping customers to accumulate a list of items for purchase. Upon 'checkout', the application typically calculates a total for the order.

Figure 4:
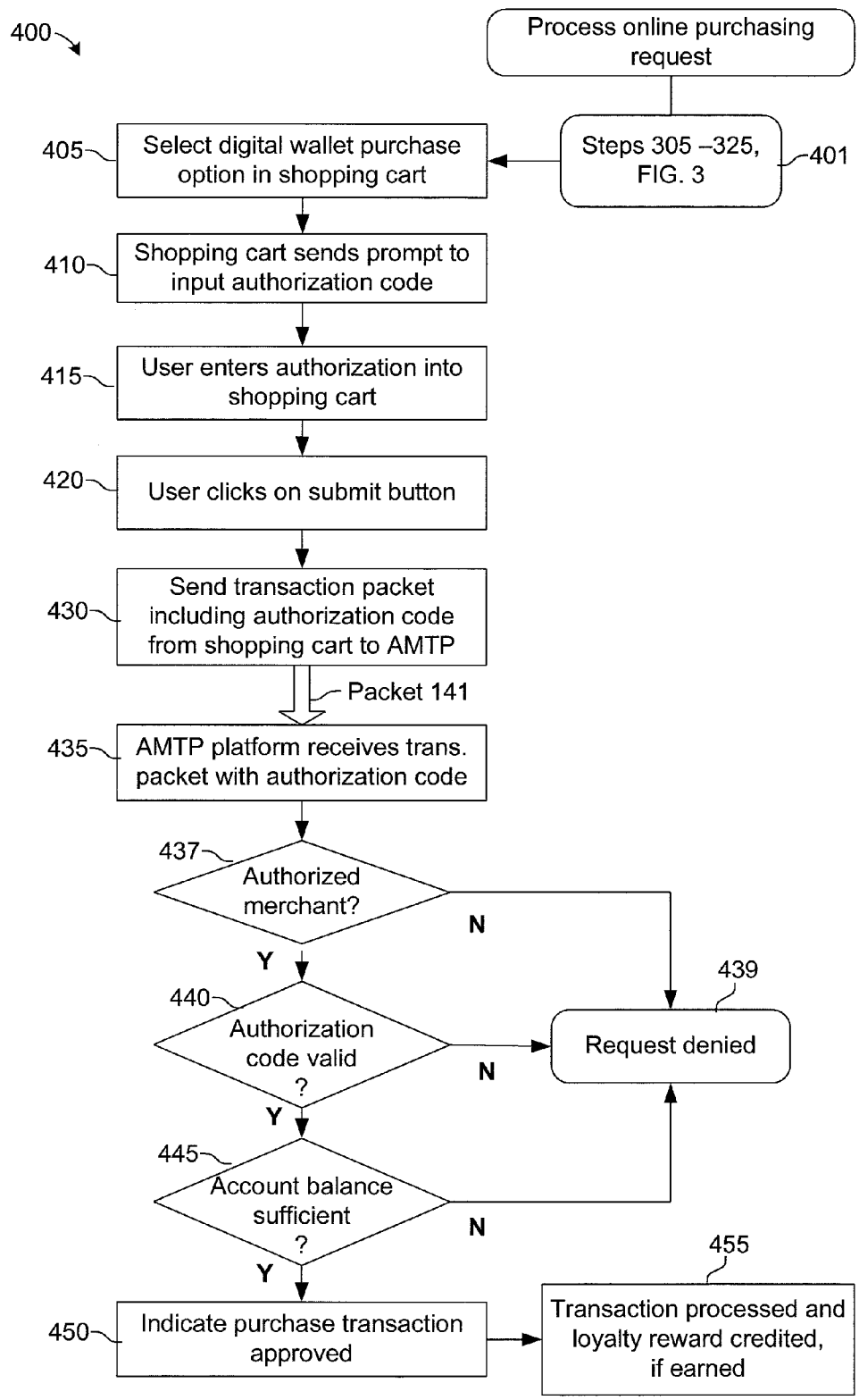
FIG. 4 is a flowchart showing an exemplary set of steps performed in anonymously processing a purchase at an online Internet site.

FIG. 4 is a flowchart showing an exemplary set of steps performed in anonymously processing a client's purchase at an online Internet website 128. In the scenario shown in FIG. 4, a client computer 132 is connected to website 128, and is now a site "user", ready for checkout, having placed items to be purchased in a shopping cart, controlled (executed) by application 131.

As shown in FIG. 4, initially, at step 401, a client (the online site user) performs steps 305-325 (shown in FIG. 3, and described above), wherein a BUY instruction is used to obtain an authorization code 116 from platform 125. At step 405, the user selects a "Pay by Digital Wallet" option, or the like, in the online shopping cart. Shopping cart application 131 then sends a prompt, displayed on the user's computer, at step 410, that requests the user to input the current authorization code 116 received on their mobile phone 110.

After entering the pending authorization code into the appropriate field in the shopping cart at step 415, the user clicks on a 'submit' button (or an equivalent button) at step 420, which causes a transaction packet 141 to be sent from the merchant website 128 to ICOM application 129 on the AMTP platform internet server 104, at step 430. The transaction packet 141 sent typically includes the merchant account number, the amount of the sale, the date and time and the code entered by the user, and in all cases includes at least authorization code 116.

Upon receiving the transaction packet at step 435, ICOM application 129 initially determines whether the online merchant is an authorized online merchant, at step 437. The system then attempts to match the pending authorization code with the current authorization code 116 at step 440, and at step 445, attempts to confirm that the client has the required funds in their digital wallet account 113. If all of the verification steps 437, 440, and 445 are successful, the system sends a reply, via the Internet, to the shopping cart application 131 with an 'approved' message at step 450, so that the transaction can be completed on the merchant side. If any of the verification steps 437, 440, or 445 fail, then the purchase request is denied, at step 439. Otherwise, at step 455, the system moves the funds from the client account, places them into the merchant account for processing, and credits the client with a loyalty reward, if earned (in the case where the 'loyalty reward' feature, described below, is enabled).

In one embodiment, if a 'preloaded' credit card, such as a "Visa® Stored Value" card is indicated as being part of a client's digital wallet account 113, platform 125 allows a client to move money on and off of the card for use and for security purposes. For example, if a client's particular preloaded credit card balance is $0.00, then when the client uses the SEND instruction to send $50.00 to platform number "8889991234" (e.g., SEND 50.00 8889991234), then if the sender's phone number matches an existing client number 111, the system moves the $50 from the client's digital wallet account to the preloaded credit card.

The AMTP platform number to which a client sends a text message may be used as an identifier for the transaction type. For example; if a client sends a SEND instruction to 8889995678, it may return a different result than if the client sends SEND to 8889991234. If, in the previous example, the client then only spends $25.00, the client can reverse the balance back to their digital wallet account by sending the request to a different platform phone number. Therefore, if the credit card is stolen or compromised at this point, there is no money present in the client's previously preloaded credit card until the client makes another such credit card transfer.

LOY application 109 is an application, executed on server 103, that enables and processes merchant-based loyalty rewards or coupon-based transactions. This application stores and responds to requests from a merchant location for transaction processing. LOY application 109 provides an Internet web page-based interface for the authorized merchant to login to for the establishment of a client coupon loyalty reward transaction. Such coupons or loyalty rewards can be currency based, percentage based or per-item description (SKU) based, and may (or may not) require multiple transactions over a specified period of time for a reward to be issued. LOY application 109 logs and maintains records of each transaction to provide reporting capability.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described.

The invention claimed is:

1. A method for anonymous processing of a purchasing request comprising:
   receiving, from a mobile phone, a first text message comprising the purchasing request;
   generating a current authorization code comprising a random number;
   sending the current authorization code, via a second text message, to the mobile phone;
   receiving, from a merchant, a communication including a pending authorization code;
   validating the purchasing request by determining that the pending authorization code is identical to the current authorization code.

2. The method of claim 1, wherein the current authorization code is valid only for a specific single said purchasing request.

3. The method of claim 1, wherein the number of the mobile phone is compared against a previously-stored number to verify that the party making the purchasing request is authorized to make the request.

4. The method of claim 1, wherein the steps of receiving, generating, and validating are performed by a platform remote from a merchant facility from which the communication originated.

5. The method of claim 1, further including:
   receiving, via a text message sent from the mobile phone, a PIN corresponding to a specific client;
   determining whether a purchasing party sending the current authorization code is registered as said client by comparing both the PIN and the number of the mobile phone with previously stored information linking the PIN and the number to the client;
   wherein the purchasing request is validated in part if it is determined that the purchasing party is registered as said client.

6. The method of claim 1, wherein the communication from the merchant is sent via a POS device at a merchant facility.

7. The method of claim 1, wherein the purchasing request includes no re-usable information that allows a subsequent purchasing request to be validated based thereon.

8. A method for anonymous processing of a purchasing transaction comprising:
   receiving, from a mobile phone of a purchasing party, a first text message comprising a purchasing request and a PIN;
   sending a current authorization code comprising a random number, via a second text message, to the mobile phone of the purchasing party, if the received PIN corresponds to the number of the mobile phone from which the purchasing request was received;
   wherein a merchant is provided with purchase data comprising a pending authorization code;
   receiving, from the merchant, a merchant communication including a data string comprising the purchase data; and
   validating the purchasing request in part by determining that the pending authorization code received in the data string is identical to the current authorization code;
   wherein the data string includes no information that enables the merchant to determine the identity of the purchasing party.

9. The method of claim 8, wherein the purchase data includes no re-usable information that allows a subsequent purchasing request to be validated based thereon.

10. The method of claim 8, wherein the current authorization code is valid only for a specific single said purchasing request.

11. The method of claim 8, wherein the steps of receiving, sending, and validating are performed by a platform remote from a merchant facility from which the merchant communication originated.

12. The method of claim 8, wherein the merchant communication is sent via a POS device at a merchant facility.

13. The method of claim 8, wherein the merchant communication is sent from a merchant website.

14. A method for anonymous processing of a purchasing transaction comprising:
   receiving, from a mobile phone of a purchasing party, a first text message comprising a purchasing request;
   generating a pre-authorization code;

sending the pre-authorization code, via a second text message, to the mobile phone of the purchasing party;
receiving, a third text message including the pre-authorization code and a PIN;
validating the third text message by determining that:
  the pre-authorization code received in the data string is identical to the current authorization code; and
  the PIN received in the data string corresponds to the number of the mobile phone from which the purchasing request was received;
generating a current authorization code comprising a random number;
sending the current authorization code, via a fourth text message, to the mobile phone of the purchasing party;
wherein a merchant is provided with purchase data comprising a pending authorization code and a PIN that corresponds to the purchasing party;
receiving, from the merchant, a communication including a data string comprising the purchase data; and
validating the purchasing request in part by determining that the pending authorization code received in the data string is identical to the current authorization code.

15. The method of claim 14, further including:
verifying that the calling phone number of the phone from which the first text message was received matches a previously stored number; and
if no match is found, then denying the purchasing request.

16. The method of claim 14, wherein the purchase data includes no re-usable information that allows a subsequent purchasing request to be validated based thereon.

17. The method of claim 14, wherein the current authorization code is valid only for a specific single said purchasing request.

18. The method of claim 14, wherein the steps of receiving, generating, sending, and validating are performed by a platform remote from a merchant facility from which the merchant communication originated.

19. A method for anonymous processing of an on-line purchasing transaction comprising:
receiving, from a mobile phone of a purchasing party, a first text message comprising a purchasing authorization request;
generating a pre-authorization code;
sending the pre-authorization code, via a second text message, to the mobile phone of the purchasing party;
receiving a third text message including the pre-authorization code and a PIN;
validating the third text message by determining that:
  the pre-authorization code received in the data string is identical to the current authorization code; and
  the PIN received in the data string corresponds to the number of the mobile phone from which the purchasing authorization request was received;
if the third text message is validated, then:
generating a current authorization code comprising a random number;
sending the current authorization code, via a fourth text message, to the mobile phone of the purchasing party;
wherein an Internet transmission, comprising a purchasing request including a pending authorization code, is received, from the purchasing party, by a shopping cart application on a merchant website;
receiving, from the merchant website, an Internet communication from the merchant website including a data string comprising the authorization code; and
validating the purchasing request in part by determining that the pending authorization code received in the data string is identical to the current authorization code.

20. The method of claim 19, wherein the current authorization code is valid only for a specific single said purchasing request.

21. The method of claim 19, wherein the steps of receiving, generating, sending, and validating are performed by a platform separate from the merchant website.

* * * * *